United States Patent [19]
Gonzalez

[11] 3,919,089
[45] Nov. 11, 1975

[54] SELF-TIGHTENING FILTER ASSEMBLY

[75] Inventor: Guillermo Gonzalez Gonzalez, Guadalajara, Mexico

[73] Assignee: Refacciones Plasticas y Metalicas, S.A., Mexico

[22] Filed: June 1, 1973

[21] Appl. No.: 365,856

[30] Foreign Application Priority Data
Nov. 8, 1972  Mexico ................................. 139573

[52] U.S. Cl. .................. 210/445; 210/451; 210/499
[51] Int. Cl.² .......................................... B01D 35/00
[58] Field of Search .......... 210/321, 445, 451, 476, 210/477, 499

[56] References Cited
UNITED STATES PATENTS

| | | | |
|---|---|---|---|
| 294,244 | 2/1884 | Lewis et al. | 210/445 X |
| 1,896,204 | 2/1933 | Schacht | 210/451 X |
| 2,504,683 | 4/1950 | Harnley | 210/445 X |
| 3,333,706 | 8/1967 | Isreeli | 210/321 |

*Primary Examiner*—Samih N. Zaharna
*Assistant Examiner*—Richard W. Burks
*Attorney, Agent, or Firm*—Hill, Gross, Simpson, Van Santen, Steadman, Chiara & Simpson

[57] ABSTRACT

A filter or strainer capable of being self-tightened when the mesh thereof becomes loose and hung at the central region thereof, thus decreasing the efficiency thereof upon changing the opening or mesh size in said region; said strainer reassuming the tightened condition by means of a device capable of gradually restoring the original condition of a replaceable straining unit.

3 Claims, 2 Drawing Figures

SELF-TIGHTENING FILTER ASSEMBLY

BACKGROUND OF THE INVENTION a. Field of the Invention

This invention relates to a filtering or straining assembly. More particularly, relates to an assembly having means capable of tightening the filtering or straining unit of the assembly, as soon as the same becomes relaxed by use.

b. The Prior Art

Generally, filtering or straining assemblies, e.g. the different sieves employed in Chemistry, among other, are provided with a body with material-retaining capacity, in the middle of which there is located, transversally, a sieve of a given mesh, originally tightened but, tending to become loose by use, hanging towards the central region thereof, and lowering thus the efficiency of the same upon changing of the opening size of the mesh in said central region. When this happens, it is necessary to discard the entire assembly since said sieve is unitary with said body, giving thus rise to economical drawbacks.

SUMMARY OF THE INVENTION

This invention provides, as one of the objects thereof, a strainer assembly wherein the sieve can be replaced without replacing the entire assembly.

It is another object of this invention to provide a strainer assembly as stated above, capable of extending the useful life of the strainer, since the characteristics thereof allow that the same be tightened as becomes unrelaxed.

It is another further object of this invention to provide a strainer assembly wherein the disassembly characteristics thereof allow for the same to be exhaustively cleaned.

According to important features of this invention and as shown in the figures of the patent drawings, an improved self-tightening straining assembly is herein disclosed. It comprises a main body having two sections which are telescopingly secured to each other by means to threads. A sieve is positioned between said sections and has a outer sieve margin supported on an inner shoulder of the lower section of the body. The upper section of the body is provided with an inner radially and axially inwardly extending annular projection which projects radially inwardly of and axially beyond the shoulder that supports the sieve margin. The inner most end of the projection is positioned to be engageable with a center section of the sieve which is free of said shoulder and any bottom side support and with the center section being in radially inwardly spaced relation with respect to the outer sieve margin. The sections are threadingly engaged to securely clamp the sieve margin in fixed assembly on the shoulder between the sections whereby the position of the threads can be further adjusted to enable a variable tightening action to be exerted by the lowermost end of the annular projection against the center section of the sieve.

DESCRIPTION OF THE PREFERRED EMBODIMENTS

Figure 1:
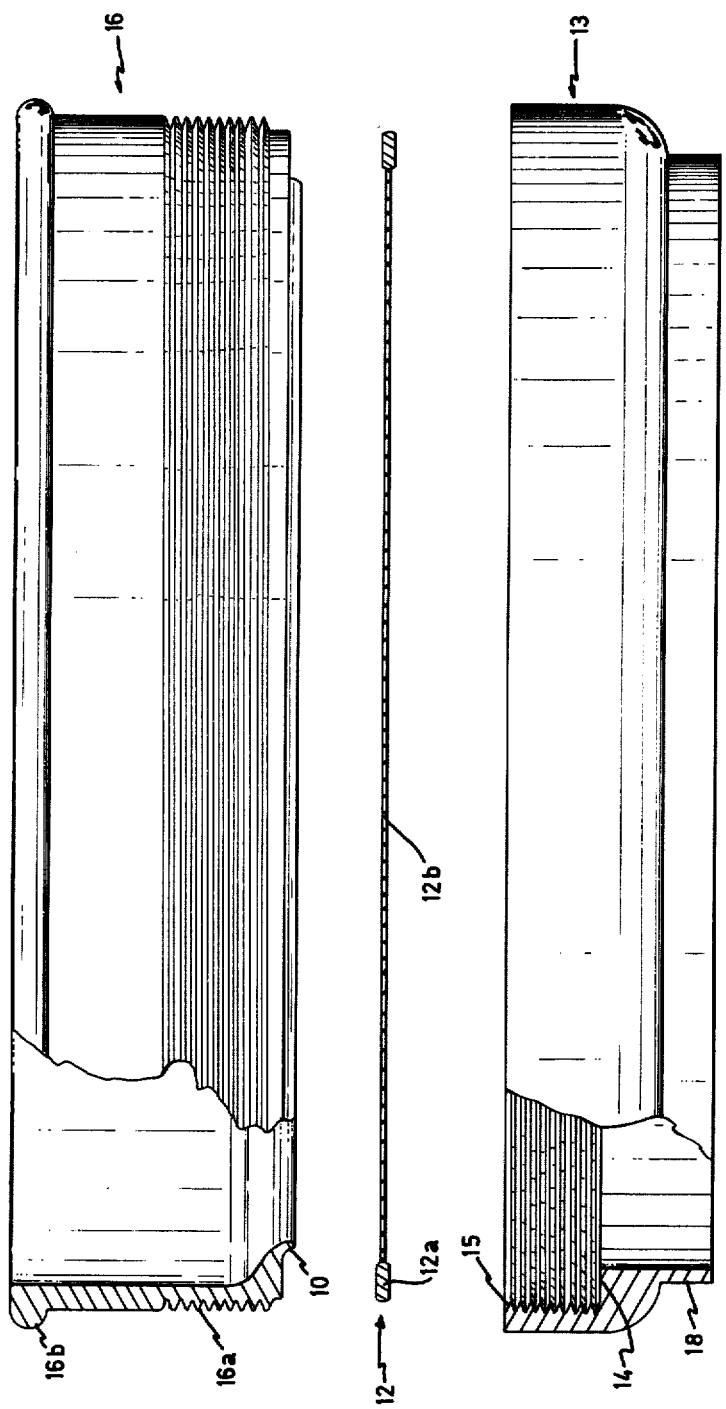
FIG. 1 is an exploded view, partially in crosssection, of the strainer assembly of this invention.

Making first reference to FIG. 1, it is clearly shown that the strainer assembly of this invention is formed by three clearly different portions: a first portion constituting an outer body or container, designated generally by numeral 13; a second portion or sieve portion capable of being inserted inside the outer portion 13, and generally designated by numeral 12; and the third portion or inner body or tightening portion, generally identified by numeral 16. Said outer portion 13 is formed with a bearing surface 14 on which a peripherical support 12a will be supported from said sieve 12, and the upper end thereof being provided with a threaded portion 15, covering approximately to the bearing surface 14, wherein the exteriorly threaded lower portion 16a of the body portion 16, is threadedly connected. Said threaded portion 16a ends at the lower portion in a downwardly depending portion directed inwardly, protruding beyond the lower end of said threaded portion, to a distance inwardly corresponding to the thickness of the peripherical support 12a, so as said depending portion 10 can be supported and bears against said sieve mesh, as illustrated in 12b.

Said body portion 16 is provided, at the upper end thereof, with a rounded ridge 16b, suitable for the manipulation of the entire assembly when mounted; and the lower end of the outer portion 16 is substantially straight and of lesser diameter as region 15. This difference in the diameters between said region 15 and said region 16 can be at least equal as the width of said peripheral support 12a, in order the whole mesh 12b of said sieve is within the space defined by the lower end region 18 of said body 13.

Figure 2:
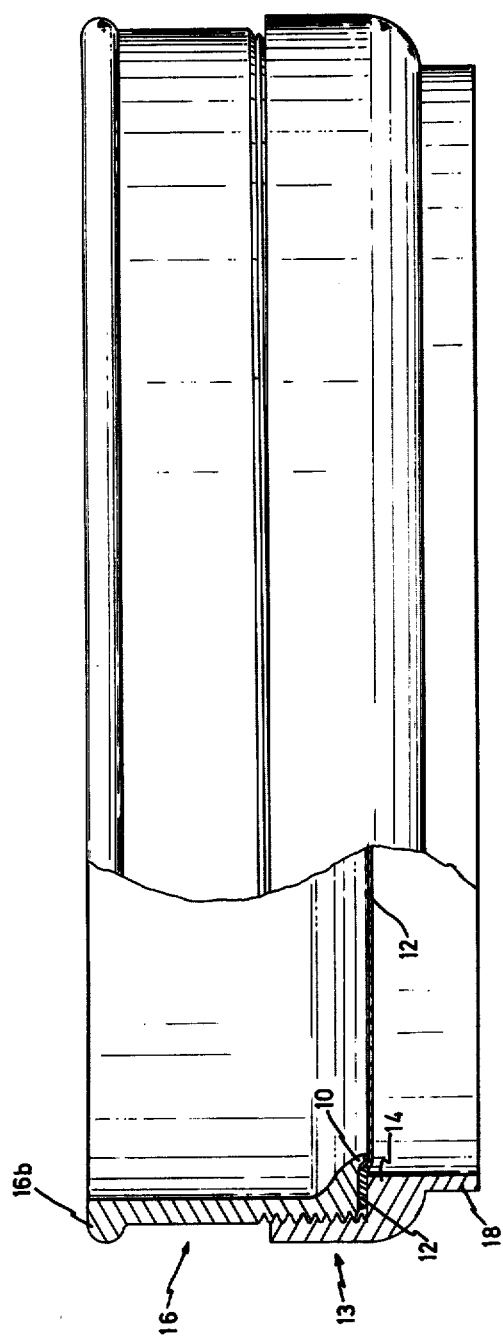
FIG. 2 is a partially sectioned view of the assembled unit.

In order to assembly all the different components of said unit, it will suffice to introduce said sieve 12 inside the upper part of said outer portion 13, so as said peripheral support 12a becomes bearing on said surface 14. Once the above has been attained, the next step implies the threaded connection of the lower end 16a to said upper end 15, interiorly thereto, until said depending portion 10 becomes bearing against the upper face of the mesh of said sieve, as shown in FIG. 2. In such a condition, the assembly is ready to use.

If in such a condition the use of the assembly shall result in said mesh 12b to sag, the only thing todo would be to rotate slightly said threaded portions 15 and 16a to tighten the coupling thereof, so as said depending portion will be moved slightly downwardly, carrying the mesh 12 to a lower level, whereby the former bulging or sagging of said mesh would change, as shown in FIG. 2, thus obtaining again the correct tightening of said mesh 12b. It will therefore be appreciated that as relative movement is effected between the threaded portions 15 and 16a, the outer sieve margin is further clamped or compresed as the former sagging is eliminated. This can be repeated several times, until said threaded portions 15, 16a arrive to the maximum coupling, in which moment said mesh 12b could not be further tightened, thus proceding to change the same with another new mesh.

It will be easily evident to those skilled in the art, likewise, that by the mere interchange of said element 12, the opening or mesh number of the mesh can be changed, whereby, with a single assembly or unit provided with the suitable sieves, a number of different uses can be served, thus obviating the need for a given number of complete straining assemblies.

Several changes and modifications will be obvious from the above, and it is intended that all of them will be covered by the true scope of the following claims.

What is claimed is:

1. Self-tightening straining assembly comprising: a main body comprised of two sections which are telescopingly secured to each other by means of threads; a sieve is between said sections and having its outer sieve margin supported on an inner shoulder of said lower section of said body; the upper section of said body being provided with an inner radially and axially inwardly extending annular projection which projects radially inwardly of said axially beyond said shoulder that supports said outer sieve margin; the inner most end of said projection being positioned and engageable with a center section of the sieve which is free of said shoulder and any bottom side support and with the center section being in radially inwardly spaced relation with respect to said outer sieve margin; said sections being threadingly engaged to securely clamp said outer sieve margin in fixed assembly on said shoulder between said sections, the outer sieve margin and the center sieve section being constructed and arranged whereby the position of the threads can be adjusted to enable a variable tightening action to be exerted by said lowermost end of said annular projection against said center section of said sieve.

2. The assembly of claim 1 further characterized by said outer sieve margin having a thickness in excess of the center section of the sieve to facilitate clamping of the sieve between said sections.

3. The assembly of claim 1 further characterized by said center section of the sieve having a reduced thickness as compared to the outer margin of said sieve so that when the threads are adjusted said projection can cause a tightening action to be exerted against the center section of the sieve.

* * * * *